March 21, 1939.  A. H. SNYDER  2,151,667
OUTSIDE PLATE FOR STORAGE BATTERY CELLS
Filed May 25, 1935  2 Sheets-Sheet 1
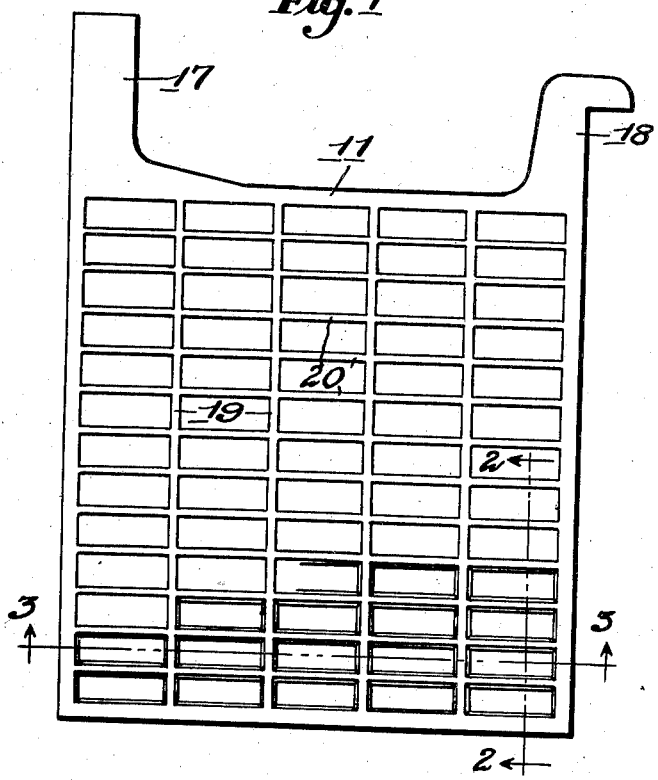
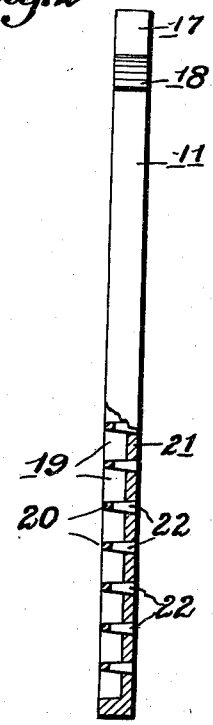
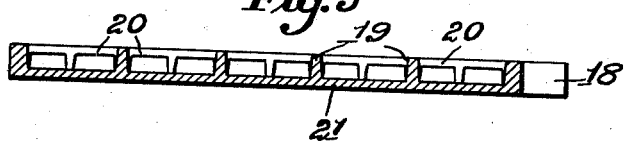
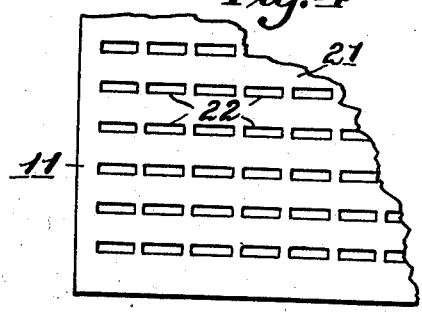
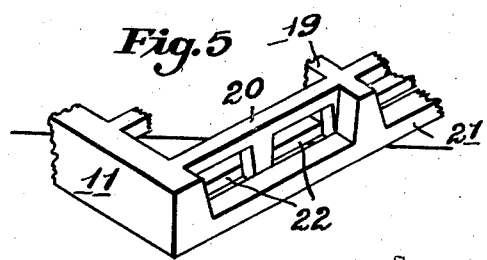
Inventor
Almond H. Snyder
By Stryker & Stryker
Attorneys

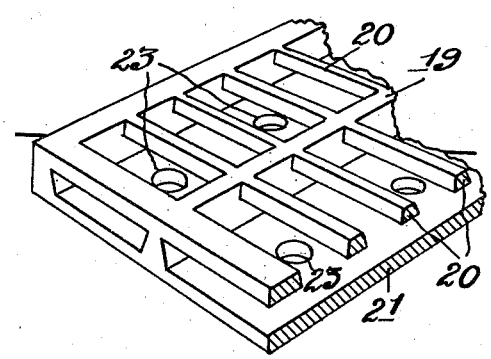
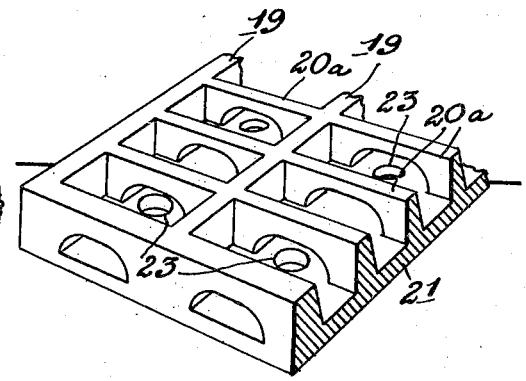
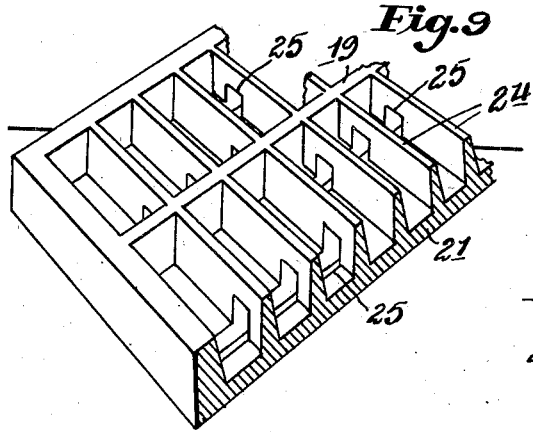
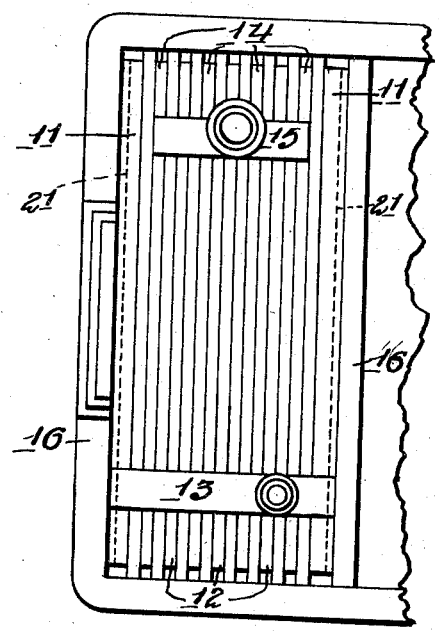
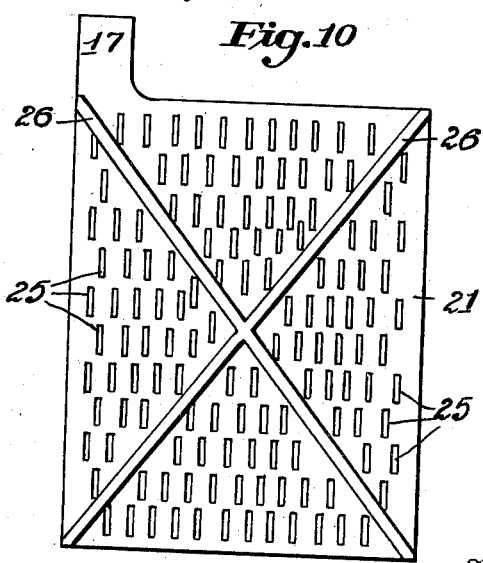

UNITED STATES PATENT OFFICE 2,151,667

OUTSIDE PLATE FOR STORAGE BATTERY CELLS

Almond H. Snyder, Lancaster, N. Y., assignor to National Battery Company, St. Paul, Minn., a corporation of Delaware Application May 25, 1935, Serial No. 23,434

1 Claim. (Cl. 136—38)

In the manufacture of storage batteries it is frequently desirable to rigidly confine or lock the groups of positive and negative plates in each cell in such manner as to prevent buckling. The present invention is designed to accomplish this by substituting for the ordinary outside plates (usually of negative polarity) a specially formed plate having adequate strength to withstand the buckling forces and to maintain the group of plates properly centered in the container. The groups of plates may be confined between a pair of the strong, rigid outside plates which fit in a container having cells of the proper size so that the outer faces of the outside plates abut against the cell walls or suitable clamps may be employed to join the outside plates together.

It is an object of this invention to provide an outside plate having the increased mechanical strength required for the purpose and so formed that the active material, or material to be made active, is applied to and confined on the inner face only of the plate.

A further object is to provide an outside plate of this class adapted to carry a supply of active material on its inner surface and formed with a relatively solid, rigid and strong back or outer wall having openings therethrough communicating with the active material to facilitate applying the active material and to allow for the escape of the gas formed in the active material in operation.

Other objects will appear and be more fully pointed out in the following specification and claim.

Referring to the accompanying drawings:

Figure 1 is a side elevation of one of my improved outside plates;

Fig. 2 is an end view of the same, partially in section, taken on the line 2—2 of Fig. 1;

Fig. 3 is a section taken on the line 3—3 of Fig. 1;

Fig. 4 is a fragmentary rear elevation of the plate;

Fig. 5 is a fragmentary, perspective view of the same;

Fig. 6 is a diagrammatic, plan view illustrating the location of the plates in the cell of a storage battery container;

Figs. 7, 8 and 9 are fragmentary, perspective views illustrating other forms of my improved plate, and Fig. 10 is an elevation showing the outer face of a plate having reinforcing ribs formed thereon.

In the drawings I have used the numeral 11 to indicate generally my improved plates which are usually of negative polarity and connected together in a cell, as indicated in Fig. 6. The other negative plates are indicated by the numeral 12 and a cross strap 13 is joined to the several plates 11 and 12 in the same cell in the usual manner. The positive plates are indicated by the numeral 14 and are joined together by a cross strap 15. Suitable separators are placed between plates and the unit thus formed is confined between walls 16 of the battery container so that the outer faces of the plates 11 engage these walls.

As illustrated in Figs. 1 to 5, inclusive, the plates 11 have conventional lugs 17 projecting therefrom for the electric connections and may also be formed with lugs 18 to engage the walls of the container for supporting the plates thereon. Formed on the front or inner face of the plate 11 is a series of vertical ribs 19 connected at suitable intervals by horizontal ribs 20. The horizontal ribs 20 are preferably spaced from a back or outer wall 21 of the plate to allow the active material, which is confined in the openings between the ribs, to pass between the ribs 20 and back wall. Extending through the back wall 21 and located in registry with the ribs 20 is a mulitplicity of horizontally elongated slots 22. These slots permit the escape of air from the pockets between ribs during the operation of applying the active material and also allow the escape of the gas formed in the active material during operation of the battery. In the absence of suitable perforations in the outer wall of the plate, such gas would loosen and dislodge the active material.

In the modified form of the invention illustrated in Fig. 7, the plate has the vertical and horizontal ribs 19 and 20 respectively, and the outer wall 21, instead of being formed with the elongated slots 22, has a series of round holes 23 to perform the same function as the slots 22. These holes 23 may be located directly behind the ribs 20, as shown in Fig. 8, or between the ribs, as shown in Fig. 7. Greater strength may be imparted to the structure by providing horizontal ribs 20a (Fig. 9) having relatively small openings therein for the active material.

A further modification of the plate is indicated in Fig. 9 wherein the horizontal ribs 24 are made relatively thin and deep and are traversed by vertically elongated slots 25 at suitable intervals. These slots extend through the rear wall 21, as indicated in Fig. 10. The plate may be reinforced by forming it with the integral ribs 26 extending diagonally on the outer surface thereof.

It will now be understood that the active material is carried on the inner face only of the plate 11 so that said material completely fills the recesses or cells between the horizontal and vertical ribs. The openings in the otherwise solid back wall 21 communicate with the recesses containing active material and facilitate applying such material in allowing the escape of air through the back wall of the plate as the active material, commonly in the form of a paste, is applied to the front face. During the use of the battery, the openings in the wall 21 allow the gas formed by the chemical action, and which would otherwise be confined between the back wall and active material, to escape from the outer face of the plate 11 with the result that the active material is not loosened and dislodged by the gas. Buckling of the plates 12 and 14 is prevented by the rigged outer plates 11 and the latter may be confined either by the container walls or by clamping means well known in this art.

As is well known in this art, the ordinary positive and negative plates are so structurally weak that they have a tendency to buckle or bend under the stresses produced by the rapid discharging and recharging of the battery. The outside plates 11, being considerably thicker than the interior plates 12 and 13 as shown in Fig. 6, have sufficient strength and rigidity to withstand the tendency of the entire group of relatively weak plates 12 and 14 to buckle or bend.

Having described my invention, what I claim as new and desire to protect by Letters Patent is:

An outside plate for storage battery cells comprising, vertical and horizontal ribs on one face only of the plate to receive active material between them, and a relatively solid back wall formed with apertures communicating with the recesses between said ribs to allow the escape of gas from said active material through said wall, certain of said ribs being spaced from said back wall and said apertures being located directly behind said last mentioned ribs.

ALMOND H. SNYDER.